United States Patent [19]

Scrivo et al.

[11] 4,213,644
[45] Jul. 22, 1980

[54] ENERGY-ABSORBING BUMPER ASSEMBLY

[75] Inventors: Jerry V. Scrivo, Durham; John V. Maloney, Dover, both of N.H.

[73] Assignee: McCord Corporation, Detroit, Mich.

[21] Appl. No.: 934,359

[22] Filed: Aug. 17, 1978

[51] Int. Cl.² .......................................... B60R 19/08
[52] U.S. Cl. ................................... 293/117; 293/136; 362/82
[58] Field of Search ............... 293/134, 117, 120, 136; 362/82

[56] References Cited

U.S. PATENT DOCUMENTS

| | | | |
|---|---|---|---|
| 3,848,916 | 11/1974 | Hulten | 293/120 |
| 3,869,164 | 3/1975 | Schwenk | 293/134 |
| 3,869,165 | 5/1975 | Miller | 293/134 |
| 3,884,516 | 5/1975 | Gallian | 293/120 |
| 4,070,051 | 1/1978 | Peter | 293/117 |

Primary Examiner—Robert R. Song
Attorney, Agent, or Firm—McGlynn and Milton

[57] ABSTRACT

An automotive body assembly including an energy absorbing bumper assembly of elastomeric foam material, such as urethane, for compressing to absorb energy in response to an impact with a light means disposed in a recess and support means connected to the light means and supported by the elastomeric material for moving with the elastomeric material upon the compression thereof to move the light means and thereafter return the light means to the initial position. The support means includes an eyebrow portion disposed forwardly of the light means. In one embodiment the eyebrow portion is embedded within the elastomeric material and in another embodiment the eyebrow portion is disposed over the elastomeric material.

13 Claims, 5 Drawing Figures

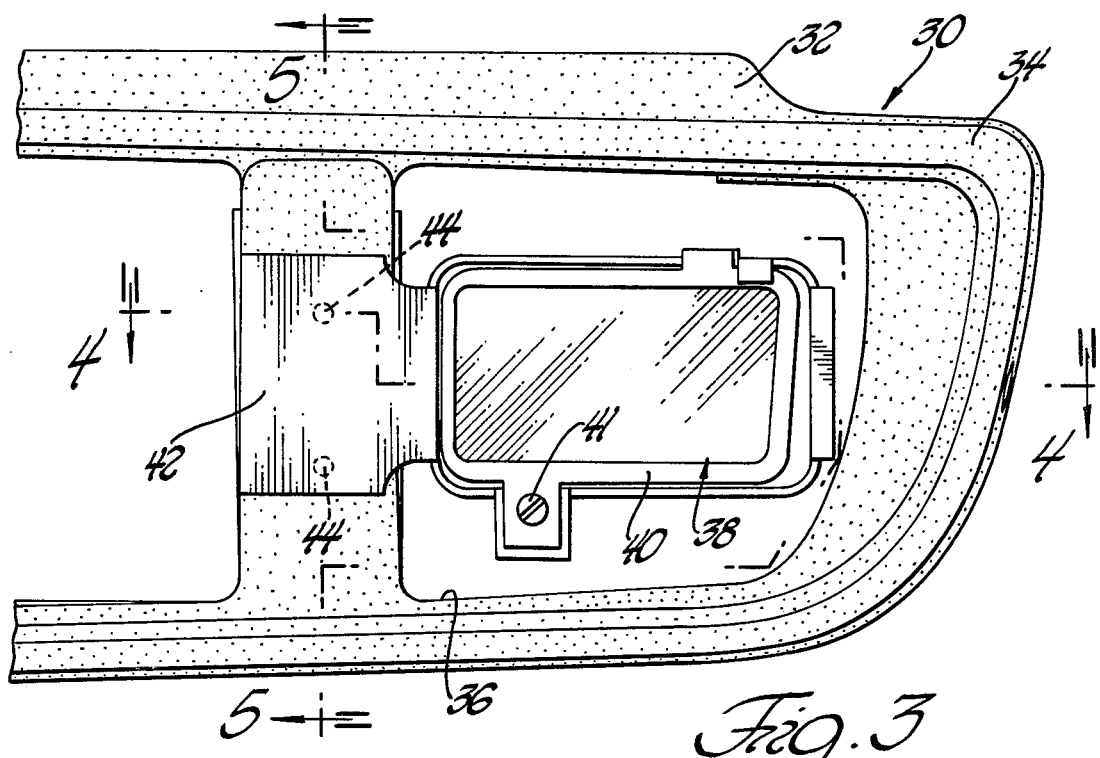
Fig. 3
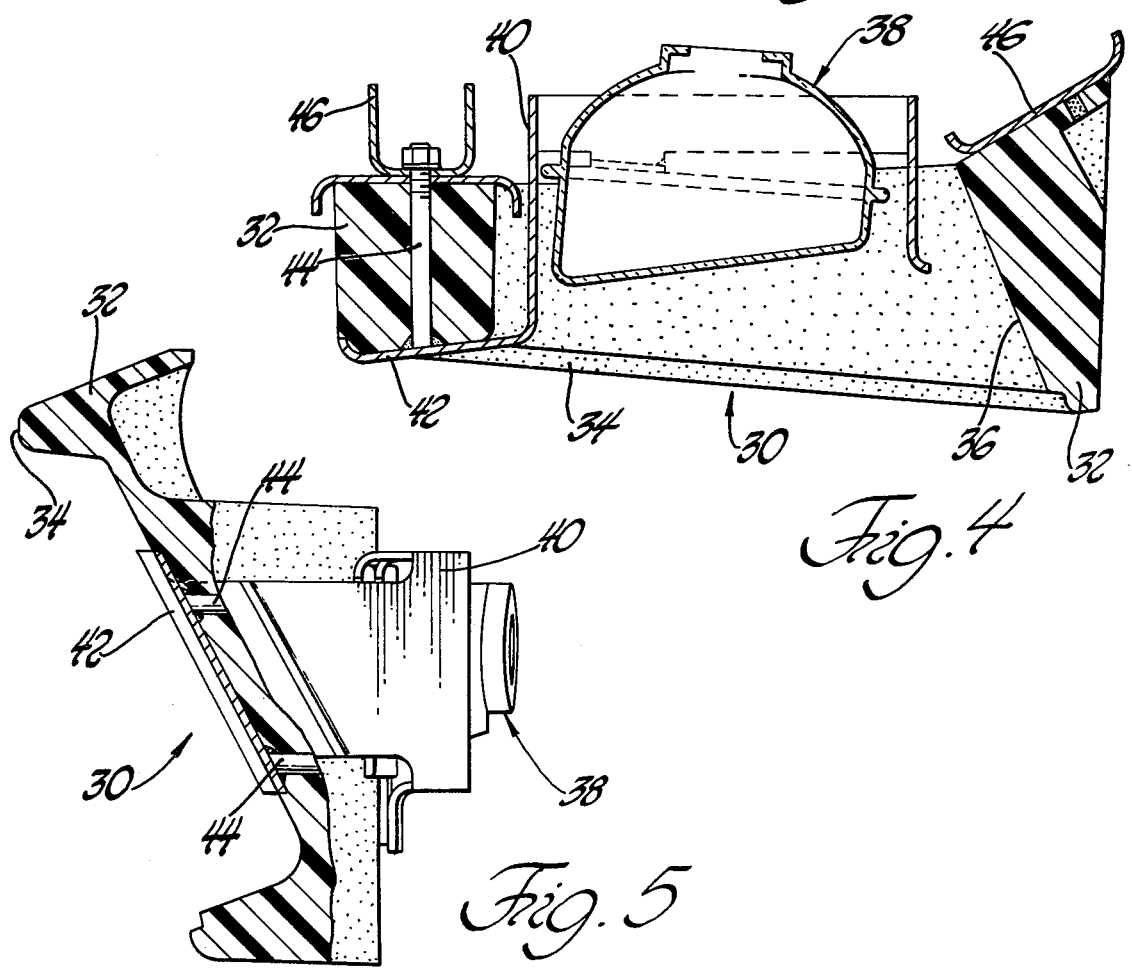
Fig. 4
Fig. 5

ENERGY-ABSORBING BUMPER ASSEMBLY

BACKGROUND OF THE INVENTION (1) Field of the Invention

The subject invention relates to an automotive body assembly including a bumper means of elastomeric material for compressing to absorb energy in response to an impact. More specifically, the invention relates to the support of a light means in such a manner that the light means will not be damaged in the event of an impact which compresses the elastomeric material of the bumper means.

(2) Description of the Prior Art

Various different energy absorbers have been utilized in bumper assemblies for automotive vehicles. When blocks of elastomeric material are utilized as the energy absorbers the lights are typically mounted to the vehicle support structure. In other instances, where hydraulic cylinders, or the like, have been utilized to absorb energy upon the impact of a bumper, the lights have been attached to the bumper to move with the bumper upon such an impact.

SUMMARY OF THE INVENTION

An automotive body assembly including bumper means of elastomeric material for compressing to absorb energy in response to an impact with the bumper means having a front face and a recess extending thereinto and light means disposed in the recess and recessed from the front face of the bumper means with support means connected to the light means and supported by the bumper means for moving with the bumper means upon the compression thereof to move the light means and thereafter return the light means to the initial position.

PRIOR ART STATEMENT

U.S. Pat. No. 3,869,164 granted Mar. 4, 1975 to Kurt Schwenk discloses an automotive body assembly including a bumper disposed rearwardly of a flexible end portion with a piston and cylinder arrangement for absorbing energy and with a light supported on the bumper to move with the bumper in response to impact. In a similar fashion, U.S. Pat. No. 4,070,051 granted Jan. 24, 1978 to Dietmar Peter, a light is supported by hinges and moves with a piston and cylinder energy absorber in response to impact. These systems require mechanical attachment frequently necessitating special brackets or hinges and in many instances the light itself may be impacted.

BRIEF DESCRIPTION OF DRAWINGS

Other advantages of the present invention will be readily appreciated as the same becomes better understood by reference to the following detailed description when considered in connection with the accompanying drawings wherein:

FIG. 3 is a fragmentary elevational view of a second embodiment of the subject invention;

FIG. 4 is a cross-sectional view taken substantially along line 4—4 of FIG. 3; and FIG. 5 is a cross-sectional view taken substantially along line 5—5 of FIG. 3.

Figure 1:
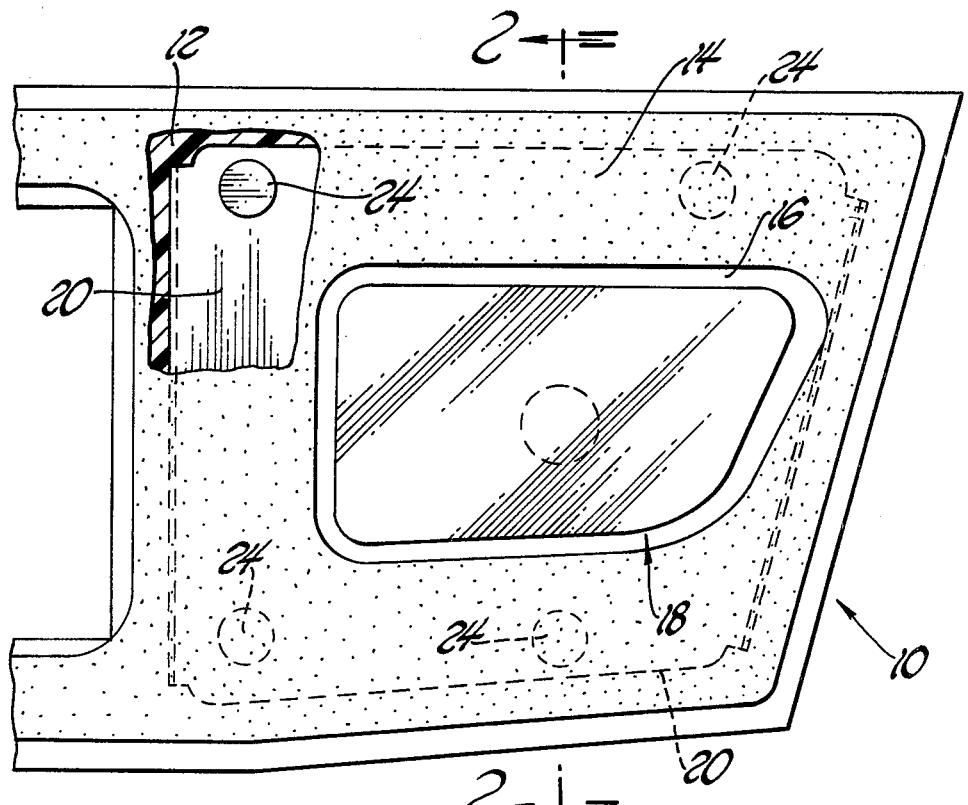
FIG. 1 is a fragmentary elevational view partially broken away and in cross section of a first preferred embodiment of the subject invention.
Figure 2:
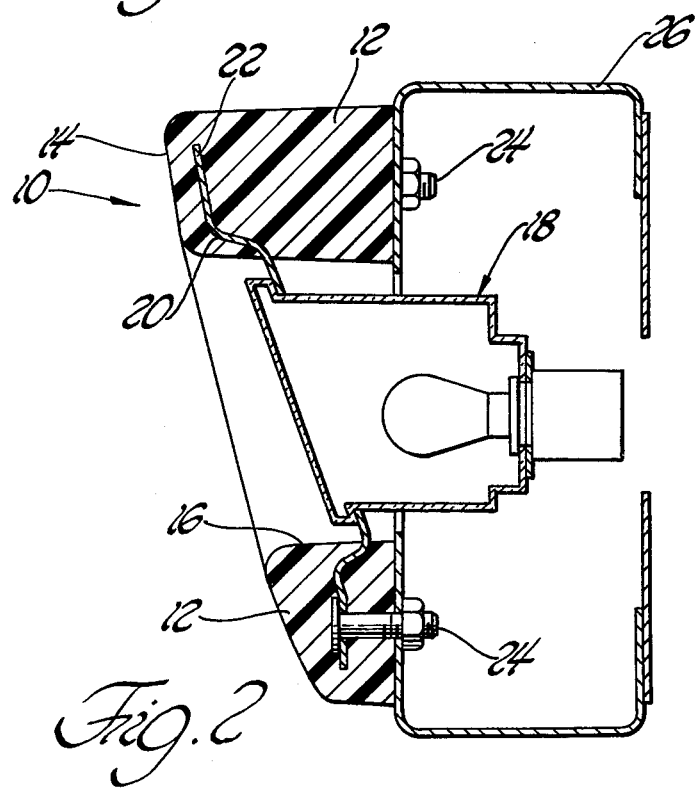
FIG. 2 is a cross-sectional view taken substantially along line 2—2 of FIG. 1.

A first embodiment of an automotive body assembly constructed in accordance with the subject invention is generally shown at 10 in FIGS. 1 and 2. The assembly 10 comprises a bumper means of elastomeric material 12. The elastomeric material 12 compresses to absorb energy in response to an impact. The elastomeric material 12 is preferably a polymeric foam such as urethane. The elastomeric material 12 defining the bumper means has a front face 14 with a recess or opening 16 extending into the elastomeric material.

A light means, generally indicated at 18, is disposed in the recess 16 and is recessed rearwardly from the front face 14 of the elastomeric material 12. The light means 18 may be of various configurations and that illustrated is only exemplary.

The assembly also includes a support means defined by a bracket 20 which is connected to the light means 18 as by welding, rivets, or other fasteners. The bracket 20 is supported by the elastomeric material 12 of the bumper means and moves with the elastomeric material 12 of the bumper means upon the compression thereof to move the light means 18 rearwardly and thereafter return the light means 18 to the initial position illustrated.

The support means or bracket 20 includes an eyebrow portion 22 which is disposed forwardly of the light means 18 and supported by the elastomeric material 12. Specifically, the eyebrow portion 22 is disposed forwardly of the forwardmost extremity of the light means 18. As the eyebrow portion 22 is disposed forwardly of the light means 18, the light means 18 will be moved rearwardly upon impact and will not be impacted. The elastomeric material 12 completely surrounds the recess or opening 16 and the support bracket 20 also surrounds the recess or opening 16.

Fastening means comprising the studs 24 extend through the support bracket 20 and through the elastomeric material 12 exteriorly thereof for attaching the elastomeric material of the bumper means to a support structure 26. The eyebrow portion 22 of the support bracket 20 is embedded in the elastomeric material 12 of the bumper means and the elastomeric material 12 includes an upper portion disposed above the recess 16 which extends forwardly of a lower portion thereof disposed below the recess 16. The eyebrow portion 22 of the support bracket 20 is disposed in the upper portion of the elastomeric material which is disposed forwardly of the lower portion.

A second embodiment of an automotive body assembly constructed in accordance with the subject invention is generally shown at 30 in FIGS. 3, 4, and 5. The assembly 30 also includes a bumper means of elastomeric material 32 which compresses to absorb energy in response to an impact. The elastomeric material 32 has a front face 34 with a recess 36 extending thereinto.

The assembly 30 also includes a support means defined by a support bracket 40 which is connected to the light means 38 by appropriate mechanical fasteners such as the fastener 41. The bracket 40 is supported by the elastomeric material 32 of the bumper means for moving with the elastomeric material 32 upon the compression thereof to move the light means 38 and to thereafter return the light means 38 to the initial position. The support bracket 40 also includes an eyebrow portion 42 disposed forwardly of the light means 38 and supported by the elastomeric material 32 of the bumper means.

Specifically, the eyebrow portion 42 is disposed over or exteriorly of the elastomeric material 32 of the bumper means. The eyebrow portion 42 is disposed laterally to the side of the light means and the light means 38 is supported in a cantilevered fashion from the eyebrow portion 42. In other words, the only support of the light means 38 is through the eyebrow portion 42 to the elastomeric material 32.

There is also included fastening means comprising the studs 44 welded to the eyebrow portion 42 and extending completely through the elastomeric material 32 for connection to the support structure 46.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An automotive body assembly comprising; support structure, bumper means of elastomeric material for compressing to absorb energy in response to an impact, said elastomeric bumper means supported by said support structure forwardly thereof for compression against said support structure, said bumper means having a front face and a recess extending thereinto, light means disposed in said recess and recessed from said front face, and support means connected to said light means and supported by said elastomeric material of said bumper means for moving solely in response to the compression of said elastomeric material of said bumper means to move said light means and to thereafter return said light means to the initial position as said elastomeric material returns to the initial position.

2. An assembly as set forth in claim 1 wherein said support means includes an eyebrow portion disposed forwardly of said light means and supported by said bumper means.

3. An assembly as set forth in claim 2 wherein said bumper means surrounds said recess.

4. An assembly as set forth in claim 2 including fastening means extending from said support means and through said bumper means for attaching said bumper means to a support structure.

5. An assembly as set forth in claim 2 wherein said eyebrow portion of said support means is embedded in said bumper means.

6. An assembly as set forth in claim 5 wherein said bumper means includes an upper portion disposed above said recess which extends forwardly of a lower portion thereof disposed below said recess.

7. An assembly as set forth in claim 6 wherein said eyebrow portion of said support means is embedded in said upper portion of said bumper means.

8. An assembly as set forth in claim 7 including fastening means extending through said support means and exteriorly of said bumper means for attaching said bumper means to a support structure.

9. An assembly as set forth in claim 2 wherein said eyebrow portion of said support means is disposed over said bumper means.

10. An assembly as set forth in claim 9 wherein said eyebrow portion is disposed laterally to the side of said light means.

11. An assembly as set forth in claim 10 wherein said light means is supported in a cantilevered fashion from said eyebrow portion.

12. An assembly as set forth in claim 11 including fastening means connected to said support means and extending through said bumper means for attaching said bumper means to a support structure.

13. An assembly as set forth in claim 2 wherein said light means is supported in a cantilevered fashion from said eyebrow portion.